June 25, 1957       F. W. MILLSPAUGH       2,797,256
DICHROIC REFLECTOR OPTICAL SYSTEM
Filed Sept. 25, 1951
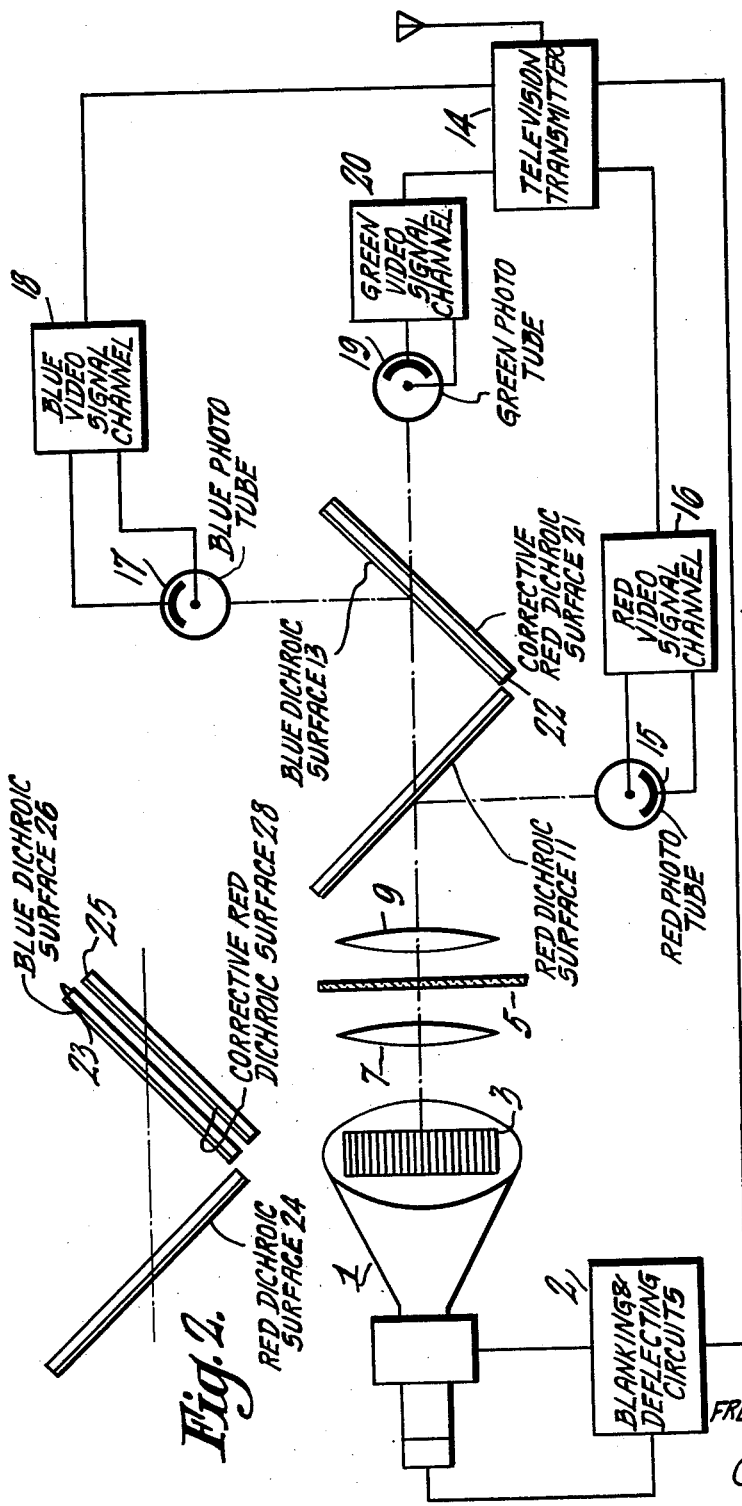
INVENTOR
FREDERICK W. MILLSPAUGH
ATTORNEY

United States Patent Office 2,797,256
Patented June 25, 1957

2,797,256
DICHROIC REFLECTOR OPTICAL SYSTEM

Frederick W. Millspaugh, Haddonfield, N. J., assignor to Radio Corporation of America, a corporation of Delaware Application September 25, 1951, Serial No. 248,207

11 Claims. (Cl. 178—5.4)

This invention relates to color and more particularly to improvements in dichroic reflectors.

Certain crystals have long been known to transmit light of one color and reflect light of another color. Some thin metallic film also exhibited the same phenomena. By evaporating alternative layers of high and low-index insulators on glass, it is possible to produce a surface having predetermined transmission and reflection characteristics, and having no appreciable absorption.

By employing a plurality of such selective reflectors, each having different light transmission and light reflection characteristics, an efficient light splitter or component color combiner may be provided.

These selective reflectors or dichroic mirrors are nearly 100% efficient; that is, nearly all of the light striking the dichroic surface is either transmitted or reflected, and only a negligible amount is lost by absorption. Dichroic mirrors make use of interference effects which may be altered by varying the thickness of coatings deposited during manufacture.

In an article by G. L. Dimmick entitled "A new dichroic reflector and its application to photocell monitoring systems," appearing in the "Journal of the Society of Motion Picture Engineers," volume 38, January 1942, on pages 36–44, there is shown and described a selective reflector which can advantageously be employed for dividing light into certain selective component colors.

If all of the incident light rays approach the dichroic surface at the same angle the effective thickness is the same. However, if the angle of incidence decreases the distance the light rays must travel through the coatings decreases, thus changing the color reflecting properties. That is, the interference phenomena which occur at particular wavelengths when light strikes the mirror at 45° incidence will occur at somewhat longer wavelengths for smaller angles of incidence, and the reflection and transmission curves for the mirror are shifted toward the red end of the spectrum.

The light rays of any source of light are not all parallel. The light rays passing from the source and through dichroic mirrors are not all parallel. The angle of incidence for light passing through the one part of the mirror is not the same as the angle of incidence of light passing through another part of the mirror. Because of the fact that the uniform coating thickness of the dichroic mirror determines the color selected, a difference in the angle of incidence of the light on the reflector will cause an irregularity in the light selection. This irregularity is sometimes referred to as color shading.

Although it is not intended that the use of this invention should be limited to color television a description of its operation will be made in connection with a color television system. Color television generally employs three separate selected colors which may, for example, be red, blue and green. In color television one form of image pickup device employs a flying spot scanner.

With the particular combination of dichroic mirrors most often used in flying spot scanners, the color shading resulting in the use of uniform dichroic layers has been objectionable only with the green color and results from the action of the red reflecting mirror.

According to this invention undesirable color shading is reduced by employing a second red reflecting mirror placed at an angle of 90° to the reflecting surface of the regular red reflecting dichroic mirror. This second or auxiliary red reflecting mirror introduces a shading approximately complementary to the original shading. This results in a relatively uniform transmission of green light. The light reflected from the second red reflecting mirror is not used.

A primary object of this invention is to provide an improved light splitting device.

Another object of this invention is to provide improved color separation in dichroic reflectors.

Still another object of this invention is to provide an improved color television transmission system.

Other and incidental objects of the invention will be apparent to those skilled in the art from a reading of the following specification and an inspection of the accompanying drawing in which:

Fig. 1 illustrates schematically this invention in one of its preferred forms; and Fig. 2 shows a modified arrangement of the dichroic surfaces used in the invention illustrated in Fig. 1.

Turning now in detail to Fig. 1, there is shown one important form of this invention. Fig. 1 shows an image producing tube or kinescope 1 which is of the type producing a brilliant blank raster of light on its screen 3. Although in normal operation of kinescopes an image is formed on the face of the image producing tube 1, its use in a flying spot scanner requires that the spot of light remain at a uniform brilliance to form a uniform or blank scanning raster. Consequently, in producing the blank raster on the screen of tube 1, the beam is unmodulated. The beam deflection is controlled by appropriate blanking and deflecting circuits 2.

The scanning raster produced on the kinescope tube face 3 is projected and focused on a transparent image 5 which may take the form, for example, of a natural color transparency. The projection and focusing of the scanning raster of the target area or face of tube 1 upon the image 5 is accomplished by an optical system including lens 7. The light rays which pass through the image area 5 are then directed through the condenser lens 9 which is not necessarily of high optical resolution but which serves to re-focus the divergent rays which pass through the image area.

The light from the image 5 is transmitted through lens 9 to be intercepted by dichroic surfaces 11 and 13 which are positioned along the axis of the rays of light and adjusted at an angle such that a portion of the different color light from image 5 will fall upon the appropriate color sensitive phototubes 15, 17 and 19.

The red reflecting dichroic surface 11 will reflect the red light and pass the blue and green light. The blue reflecting dichroic surface 13 will reflect the blue light and pass the green light. For the purpose of illustration, phototube 15 will collect the red light, phototube 17 will collect the blue light and phototube 19 will collect the green light.

To correct for the spurious color shading in the green light, a corrective red dichroic surface 21 is placed in front of the green light collecting phototube 19 parallel to the blue dichroic surface 13 and perpendicularly to the regular red dichroic surface 11. In the form of the invention shown in Fig. 1, the blue dichroic surface 13 and the corrective red dichroic surface 21, are evaporated on the same planar transparent support member 22.

The phototubes 15, 17 and 19 may be color responsive and appropriate color filters may be used in front of the phototubes but filters are not necessary. It is well shown and described in the published art that these phototubes develop signals representing the scanned selected component colors of the image. The signals from the red phototube 15, the blue phototube 17, and the green phototube 19 are fed into the television transmitter 14 through the red video signal channel 16, the blue video signal channel 18, and the green video signal channel 20 respectively. A complete system employing a flying spot scanner is well shown and described in an article entitled "Simultaneous all-electronic color television" in the "RCA Review" for December 1946.

The signals developed may be employed in the transmission of color images with other types of television transmitters. One such other type has become known as the "Dot Multiplex" type.

Fig. 2 shows another arrangement of the dichroic mirrors which is similar to the arrangement shown in Fig. 1 except that the blue dichroic surface 26 and the corrective red dichroic surface 28 are evaporated on separate support members 23 and 25 respectively. It will be noted, however, that the corrective red surface 28 is perpendicular to the red dichroic surface 24.

Having thus described my invention, what I claim and desire to secure by Letters Patent is:

1. An optical system comprising in combination means for directing light along a divergent path, a first transparent support member positioned obliquely in said light path, a color selective transparent layer supported by said support member, a second transparent support member positioned obliquely in said light path and at a right angle to said first transparent support member, a color selective transparent layer supported by said second support member, a third support member positioned obliquely in said light path and suitably positioned at a right angle to said first transparent support, and a color selective transparent layer, similar to said layer on said first support, supported by said third support member.

2. An optical system comprising in combination means for directing light along a divergent path, a first planar transparent support positioned obliquely in said light path, a dichroic layer supported by said transparent support, a second planar transparent support positioned obliquely in said light path and perpendicularly to said first transparent support, a dichroic layer supported by said second transparent support, a third planar transparent support positioned obliquely in said light path and perpendicularly to said first transparent support, and a dichroic layer, having similar light transmission and light reflection characteristics to said layer on said first support, supported by said third transparent support.

3. An optical system comprising in combination a source of light rays adapted to follow a divergent path, a red reflecting dichroic mirror positioned obliquely in said light path, a blue reflecting dichroic mirror positioned obliquely in said light path, and a corrective red dichroic mirror positioned obliquely in said light path and at a right angle to said red reflecting dichroic mirror.

4. An optical system comprising in combination a source of a beam of light, a first planar transparent support member positioned at approximately at 45° angle to said beam, a dichroic layer on a surface of said support member, a second planar transparent support member positioned at approximately a 450 angle to said beam and at approximately a 90° angle to said first support member, a dichroic layer on a surface of said second support member, a third planar transparent support member positioned at approximately a 45° angle to said beam and at approximately a 90° angle to said first support member, and a dichroic layer, similar to said layer on said first support member, on a surface of said third support member.

5. A color film scanning device comprising a flying spot kinescope, a transparency, means for projecting light from said kinescope through said transparency, a plurality of phototubes, an optical system for dividing the light from said transparency position among said phototubes each collecting light of a different primary color, said optical system comprising a first planar transparent support positioned at an oblique angle to said projected light, a dichroic layer supported by said transparent support, a second planar transparent support positioned at an oblique angle to said projected light, a dichroic layer supported by said second transparent support, and a third planar transparent support positioned at an oblique angle to said projected light and perpendicularly to said first transparent support, said third planar transparent support having a dichroic layer similar to that of said first transparent support.

6. In an electro-optical system for color transmission, a transparency, a flying spot scanner, means for projecting light from said flying spot scanner onto said transparency, a plurality of light responsive devices, a system of dichroic mirrors arranged to direct the light from said transparency onto said devices, each of which is positioned to collect light corresponding to a different color, said system of dichroic mirrors comprising a red reflective dichroic mirror positioned obliquely to said light source, a blue reflective mirror positioned obliquely to said light source and perpendicularly to said red reflecting dichroic mirror, and a corrective red dichroic mirror positioned obliquely to said light source and perpendicularly to said red reflective dichroic mirror.

7. An optical system comprising in combination means for directing a beam of light along a divergent path, a first transparent support member positioned obliquely in said light path, a color selective transparent layer supported by said support member, and a second transparent support member positioned obliquely in said light path and perpendicularly to said first support member, said second support member having a color selective transparent layer supported by said second support member on one surface and a color selective transparent layer, having similar light transmission and light reflection characteristics to said layer on said first support member, supported by said second support member on the other surface of said second support member.

8. An optical system comprising in combination a source of a beam of light, a first planar transparent support suitably positioned at an oblique angle to said beam, a red reflecting dichroic surface evaporated onto a surface of said support member, and a second planar transparent support member suitably positioned at an oblique angle to said beam and at a right angle to said first support member, said second support member having a blue reflecting dichroic surface evaporated on one surface of said second support member and a red reflecting dichroic surface evaporated on the other surface of said second support member.

9. In an electro-optical system for color transmission, a transparency, a flying spot scanner, means for projecting light from said flying spot scanner through said transparency, a plurality of light responsive devices, and a system of dichroic mirrors arranged to direct light from said transparency position onto said devices, each of which are placed to collect light of a different primary color, said system of mirrors comprising a first planar support member suitably positioned at an oblique angle to said projected light, a red reflecting dichroic surface evaporated onto a surface of said first support member, a second planar transparent support member suitably positioned at an oblique angle to said projected light and perpendicularly to said first support member, said second support member having a blue reflecting dichroic surface evaporated onto one of said second support member surfaces and a red reflecting dichroic surface evaporated on the other surface of said second support member.

10. An optical system comprising in combination means for directing light along a divergent path, a first dichroic layer positioned at an oblique angle to said path, a second dichroic layer positioned at an oblique angle to said path and perpendicular to said first dichroic layer, a third dichroic layer having light transmission and light reflection characteristics similar to those of said first dichroic layer, said first and third layers being so angularly disposed relative to each other in said path as to present effectively a uniform optical thickness to all rays of light in said path.

11. In an optical system, the combination of means for directing light along a path, a first color light reflecting dichroic mirror positioned obliquely in said light path, a second color light reflecting dichroic mirror positioned obliquely in said light path, and a corrective dichroic mirror having the same color light reflecting characteristic as said first mirror positioned obliquely in said light path and at a right angle to said first mirror.

References Cited in the file of this patent
UNITED STATES PATENTS

| | | |
|---|---|---|
| 2,335,180 | Goldsmith | Nov. 23, 1943 |
| 2,379,790 | Dimmick | July 3, 1945 |
| 2,403,685 | Sachtleben et al. | July 9, 1946 |
| 2,552,070 | Sziklai | May 8, 1951 |
| 2,560,351 | Kell et al. | July 10, 1951 |
| 2,589,930 | Dimmick et al. | Mar. 18, 1952 |
| 2,590,906 | Tripp | Apr. 1, 1952 |
| 2,595,553 | Weimer | May 6, 1952 |
| 2,627,547 | Bedford | Feb. 3, 1953 |